(12) United States Patent
Misawa et al.

(10) Patent No.: US 12,339,210 B2
(45) Date of Patent: Jun. 24, 2025

(54) PARTICLE MEASURING DEVICE

(71) Applicant: Hitachi, Ltd., Tokyo (JP)

(72) Inventors: Tomonari Misawa, Tokyo (JP); Takuya Kambayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 706 days.

(21) Appl. No.: 17/574,325

(22) Filed: Jan. 12, 2022

(65) Prior Publication Data

US 2022/0244161 A1 Aug. 4, 2022

(30) Foreign Application Priority Data

Feb. 3, 2021 (JP) .................................. 2021-016166

(51) Int. Cl.
*G01N 15/0227* (2024.01)
*B08B 9/02* (2006.01)
*G01N 15/0205* (2024.01)
*G01N 21/15* (2006.01)

(52) U.S. Cl.
CPC ..... *G01N 15/0227* (2013.01); *G01N 15/0211* (2013.01)

(58) Field of Classification Search
CPC .................. G01N 15/0227; G01N 15/0211
See application file for complete search history.

(56) References Cited

U.S. PATENT DOCUMENTS

| 9,170,191 B2* | 10/2015 | Coffin | G01N 21/255 |
| 10,921,239 B2* | 2/2021 | Kono | G01N 21/05 |
| 2013/0335731 A1 | 12/2013 | Jorden | |
| 2014/0116120 A1 | 5/2014 | Seckar | |
| 2020/0326267 A1 | 10/2020 | Misawa | |

FOREIGN PATENT DOCUMENTS

| CN | 203490155 U | 3/2014 |
| CN | 206132564 U | 4/2017 |
| CN | 110895237 A | 3/2020 |
| JP | H05172728 A | 7/1993 |
| JP | 2016099238 A | 5/2016 |
| JP | 2020-173244 A | 10/2020 |
| WO | 2006116882 A1 | 11/2006 |

OTHER PUBLICATIONS

Extended European Search Report issued on Jun. 27, 2022 for European Patent Application No. 21217924.6.
Chinese Office Action issued on Aug. 7, 2024 for Chinese Patent Application No. 202111454335.7.

* cited by examiner

*Primary Examiner* — Rebecca C Bryant
(74) *Attorney, Agent, or Firm* — Volpe Koenig

(57) ABSTRACT

To provide a particle measuring device capable of removing particles adhering to an observation window for capturing an image of the particles and measuring an accurate particle size distribution. A particle measuring device that image-recognizes particles contained in a fluid to be measured and measures a physical quantity of the particles includes: a sample holding region that holds a sample containing the particles; an observation window disposed on a wall surface of the sample holding region; and a cleaning nozzle configured to discharge a cleaning liquid toward the observation window, in which the cleaning liquid is different from the fluid to be measured.

11 Claims, 12 Drawing Sheets

[FIG. 1]
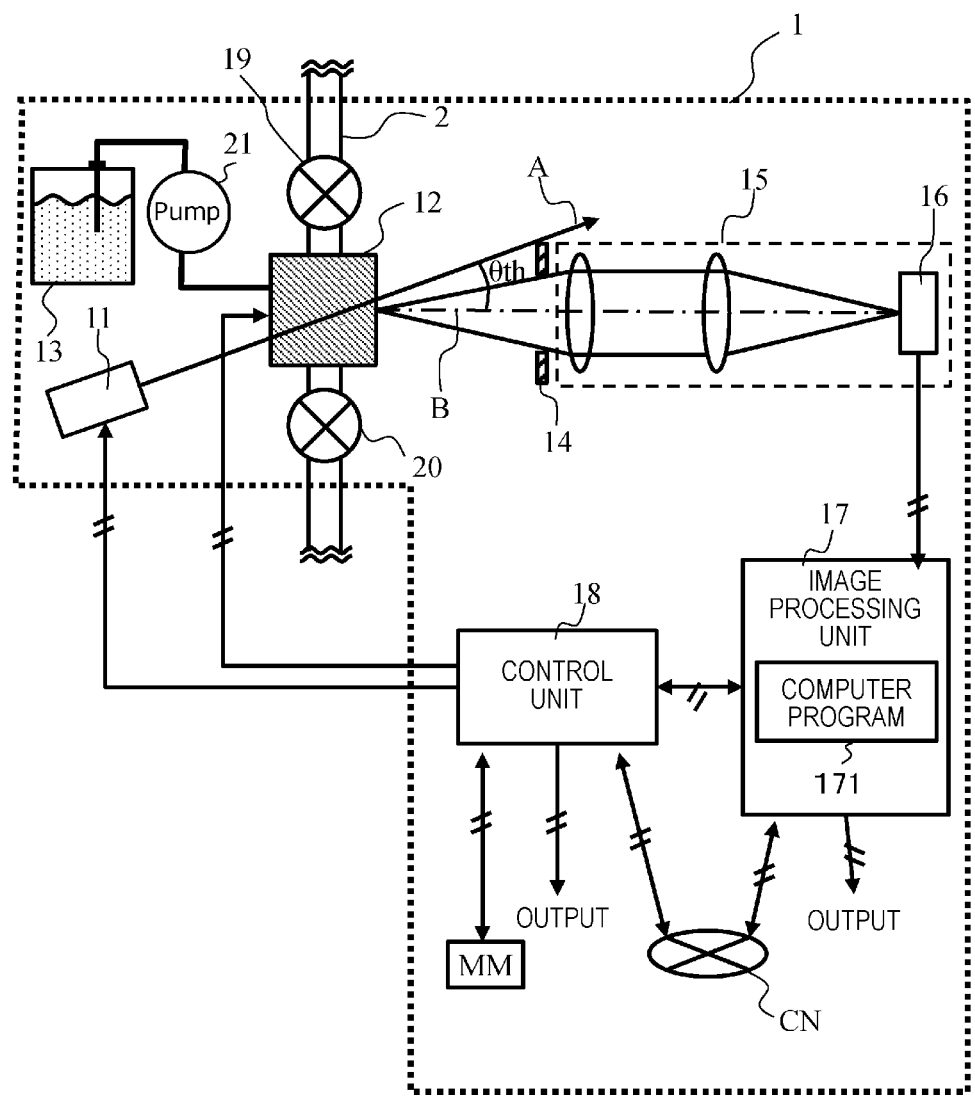

[FIG. 2]
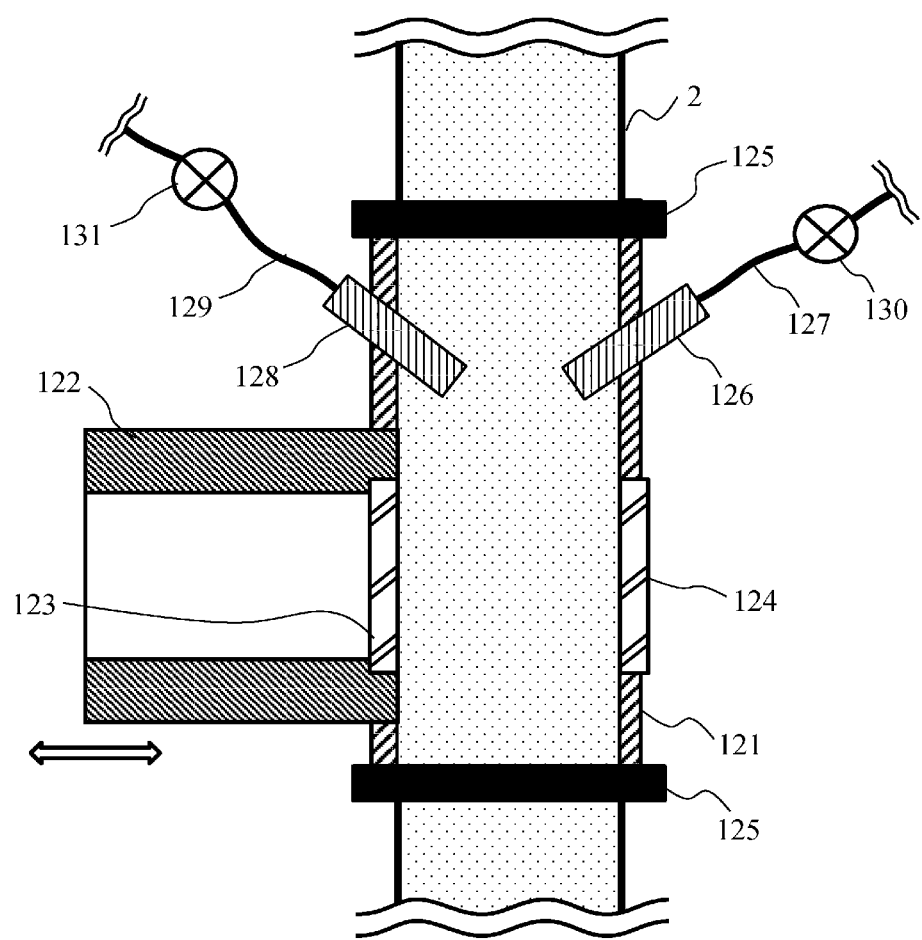

[FIG. 3]
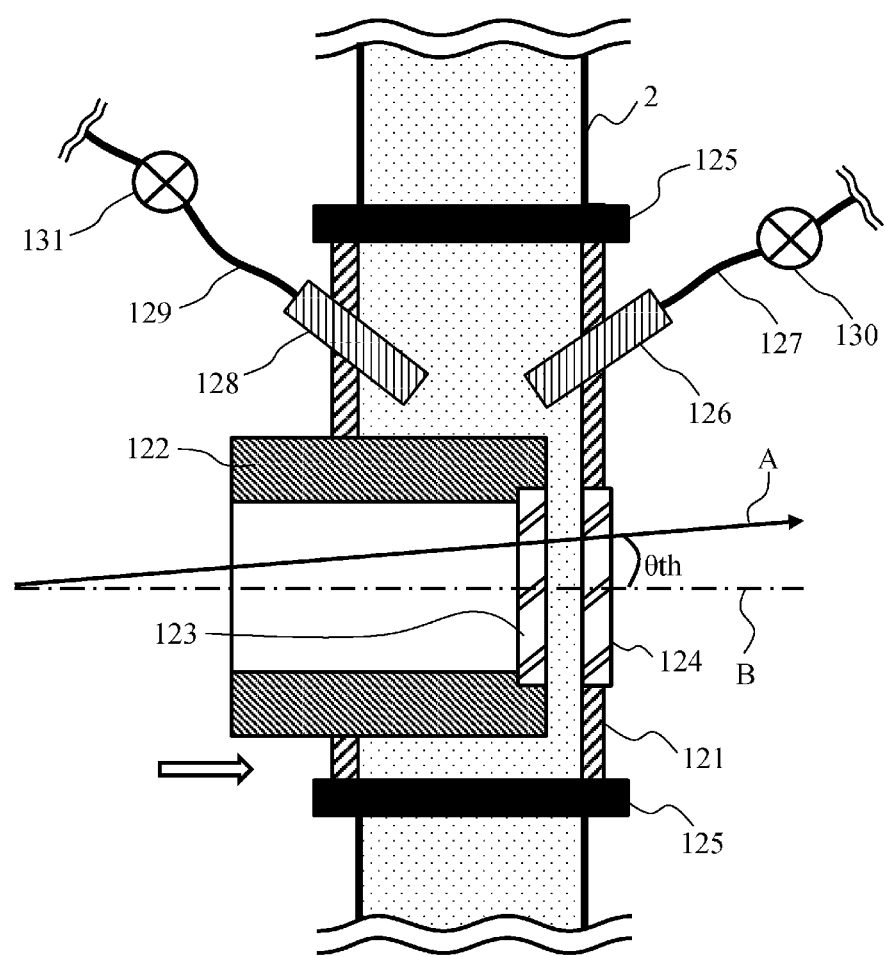

[FIG. 4]
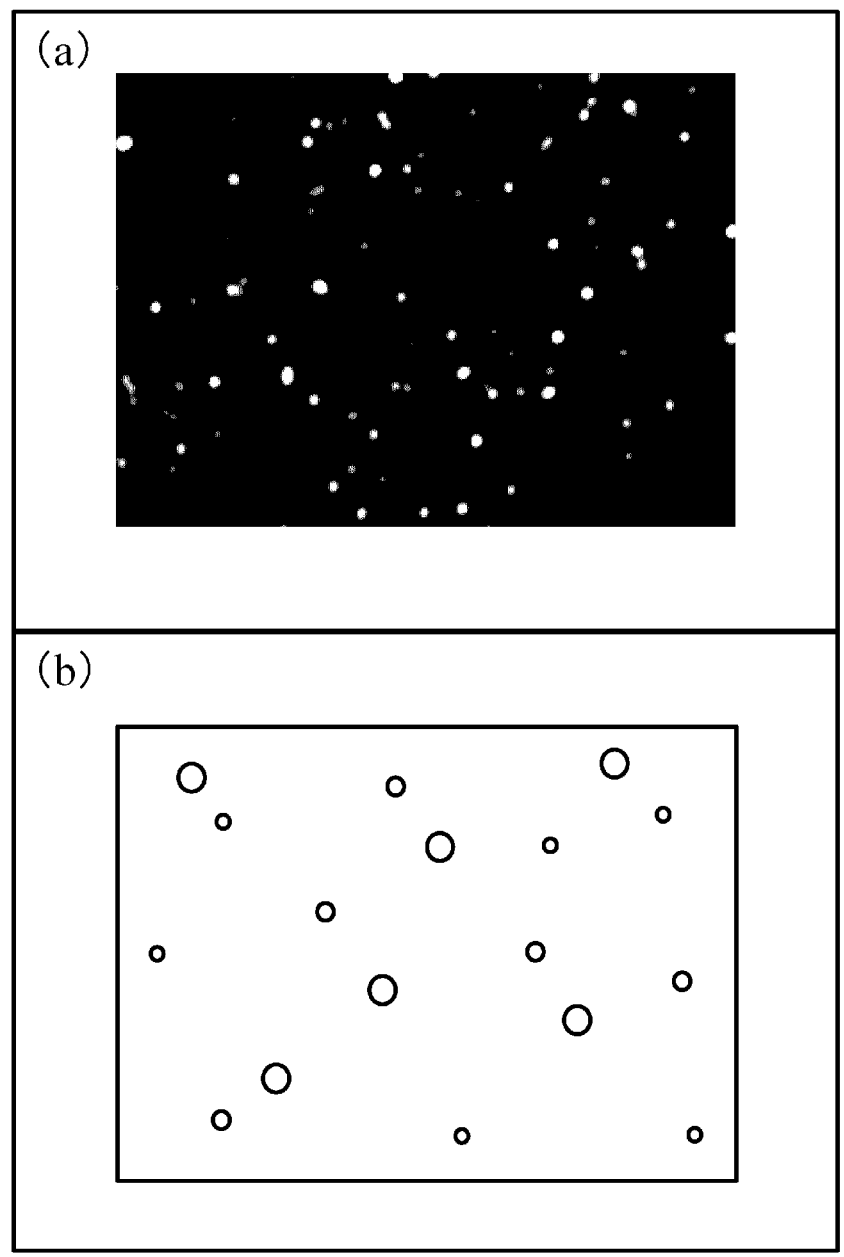

[FIG. 5]
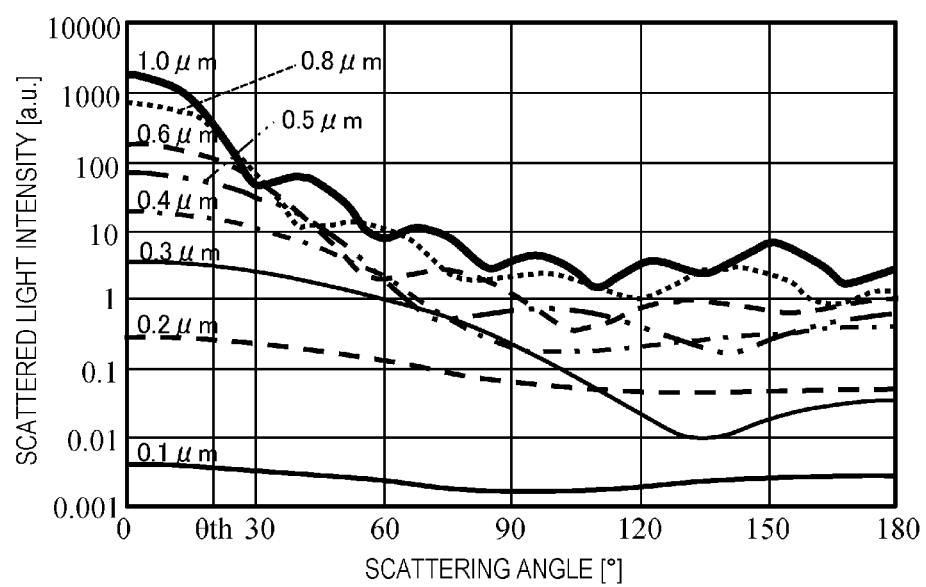

[FIG. 6]
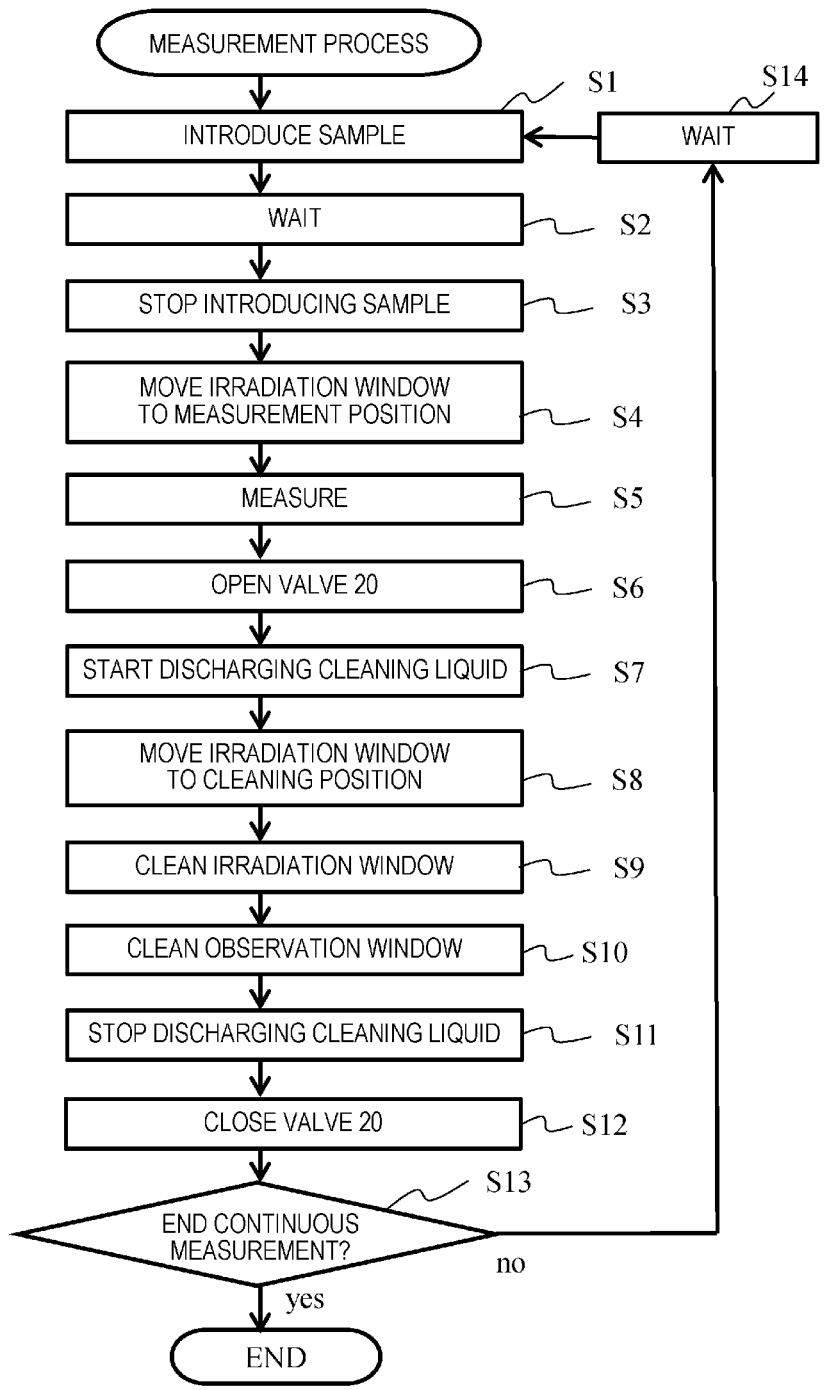

[FIG. 7]
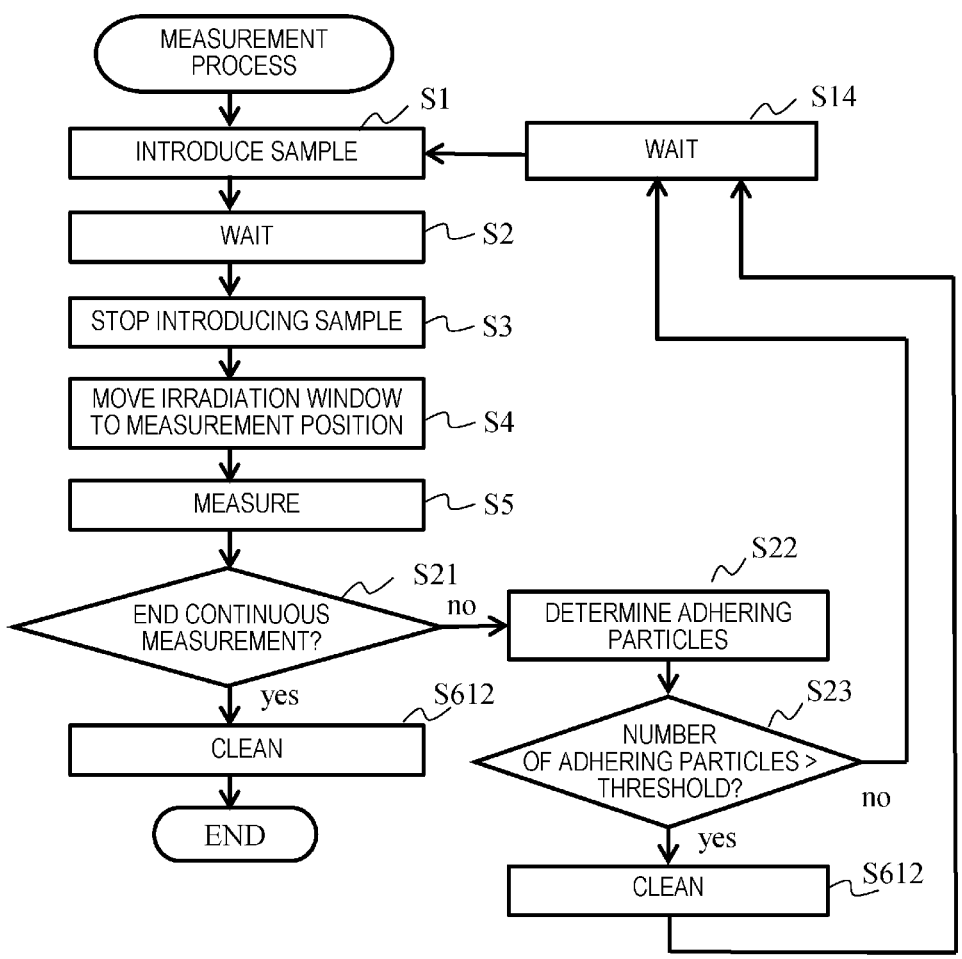

[FIG. 8]
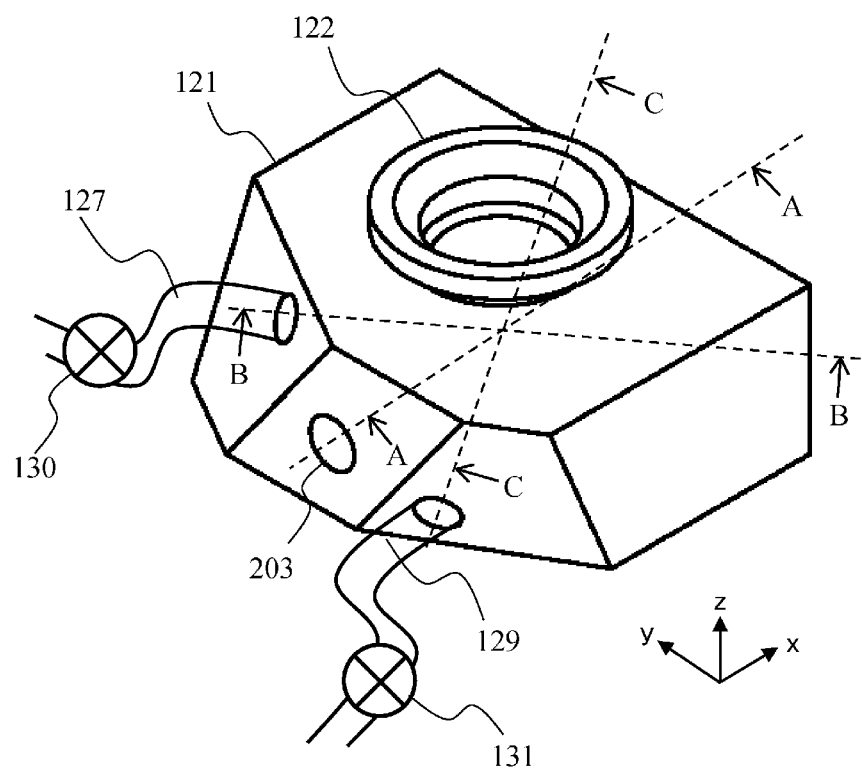

[FIG. 9]
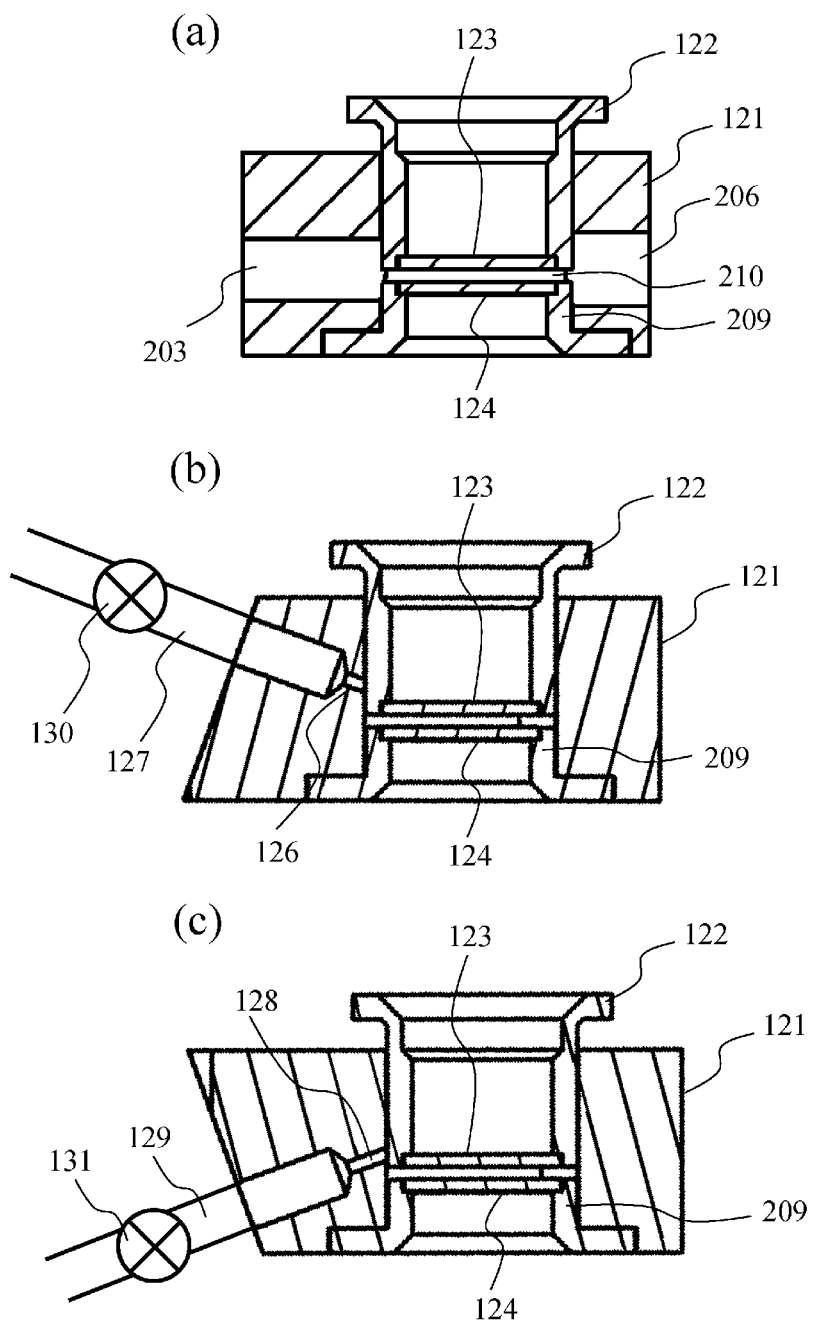

[FIG. 10]
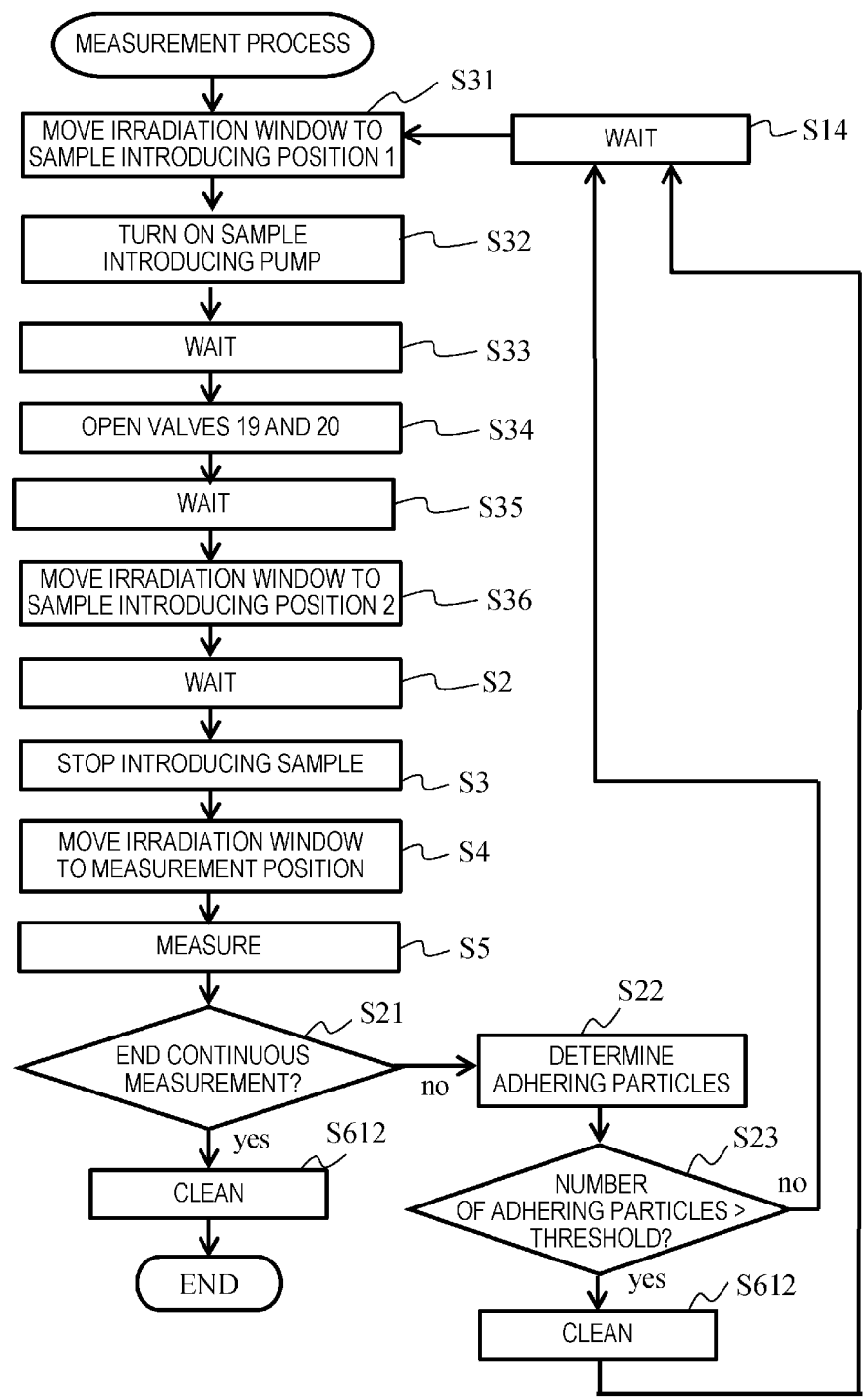

[FIG. 11]
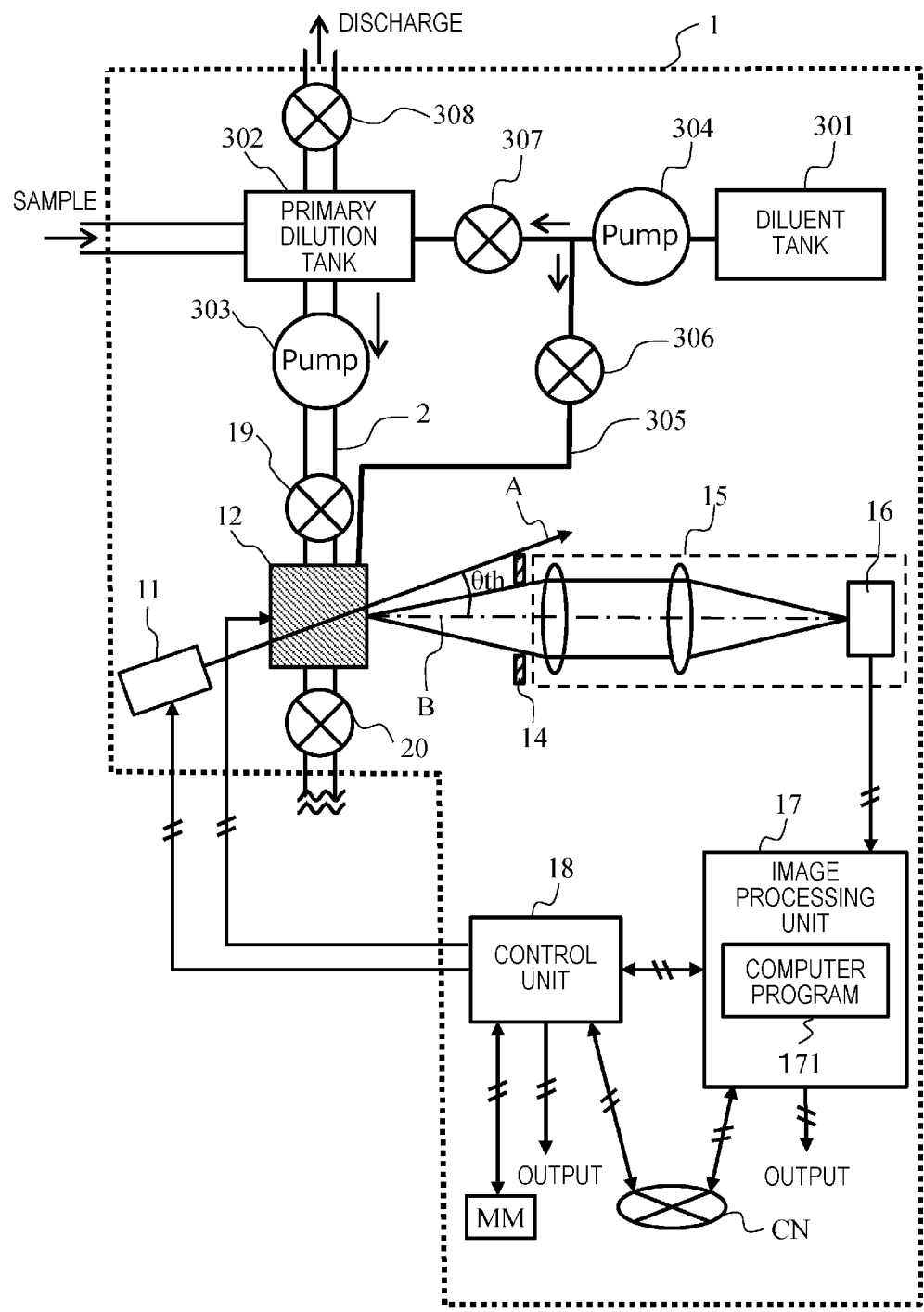

[FIG. 12]
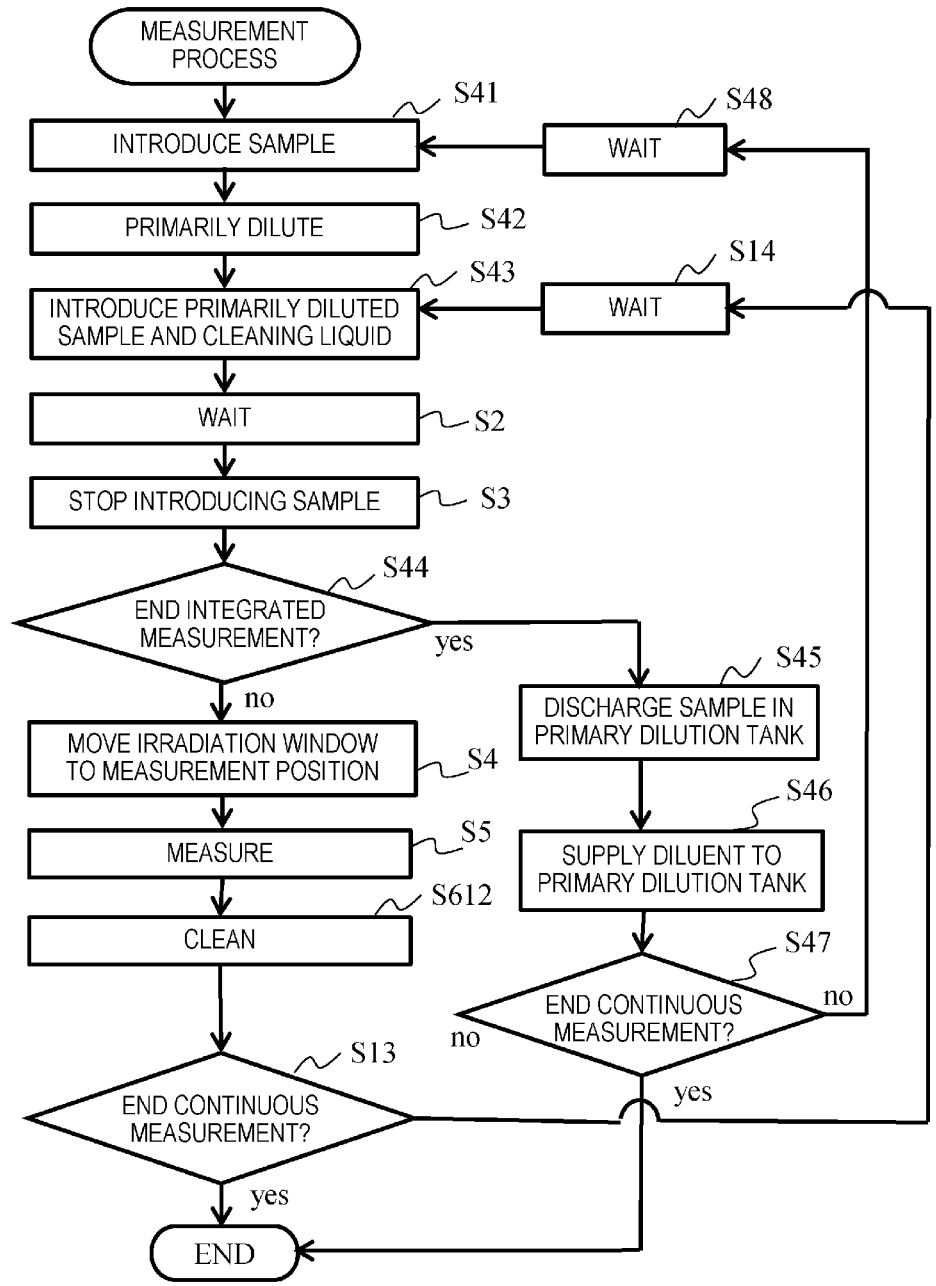

PARTICLE MEASURING DEVICE

TECHNICAL FIELD

The present invention relates to a particle measuring device that measures a physical quantity of particles.

BACKGROUND ART

PTL 1 describes a technique for measuring a size and a particle size distribution of a sample. PTL 1 discloses that there are provided a first light source that irradiates a sample containing particles with parallel light; a first image capturing device that is disposed so as to substantially face the first light source to sandwich the sample and captures an image of the sample; and an image analysis unit that analyzes the image captured by the first image capturing device, in which the first image capturing device and the first light source are arranged so as to substantially face each other such that an image of scattered light in which the parallel light incident on the particles is scattered at a predetermined angle or less can be captured by the first image capturing device, and the image analysis unit calculates a size of the particles based on the scattered light image captured by the first image capturing device.

CITATION LIST

Patent Literature

PTL 1: JP 2020-173244 A

SUMMARY OF INVENTION

Technical Problem

In the technique of PTL 1, each particle is recognized from the captured scattered light image, and a particle size is calculated from a shape of the recognized particle. However, a matter is not taken into consideration in that when the particles adhere to an observation window that captures an image of the particles, the adhering particles are always detected, and an accurate particle size distribution cannot be measured during continuous measurement.

The invention has been made in view of the above problem, and an object of the invention is to provide a particle measuring device capable of removing particles adhering to an observation window that captures an image of the particles and measuring an accurate particle size distribution.

Solution to Problem

The invention is, for example, a particle measuring device that image-recognizes particles contained in a fluid to be measured and measures a physical quantity of the particles, and includes a sample holding region that holds a sample containing particles, an observation window disposed on a wall surface of the sample holding region, and a cleaning nozzle that discharges a cleaning liquid toward the observation window, in which the cleaning liquid is different from the fluid to be measured.

Advantageous Effect

According to the invention, the particles adhering to the observation window can be removed, and an accurate size of the particles and an accurate particle size distribution can be measured.

BRIEF DESCRIPTION OF DRAWINGS

FIG. 1 is a schematic configuration diagram of a particle measuring device according to a first embodiment.

FIG. 2 is a cross-sectional view of a configuration of a measuring unit according to the first embodiment at the time of cleaning.

FIG. 3 is a cross-sectional view of a configuration of the measuring unit according to the first embodiment at the time of measuring particles.

FIG. 4 illustrates diagrams illustrating scattered light images according to the first embodiment.

FIG. 5 is a property diagram illustrating a scattering angle and a property of a scattered light intensity with respect to a particle size according to the first embodiment.

FIG. 6 is a flowchart of a particle size distribution measurement process according to the first embodiment.

FIG. 7 is a flowchart of a particle size distribution measurement process according to a second embodiment.

FIG. 8 is an external view of a measuring unit according to a third embodiment.

FIG. 9 is a cross-sectional view of FIG. 8.

FIG. 10 is a flowchart of a particle size distribution measurement process according to a third embodiment.

FIG. 11 is a schematic configuration diagram of a particle measuring device according to a fourth embodiment.

FIG. 12 is a flowchart of a particle size distribution measurement process according to the fourth embodiment.

DESCRIPTION OF EMBODIMENTS

Hereinafter, embodiments of the invention will be described with reference to the drawings. A particle measuring device according to the present embodiment image-recognizes particles contained in a fluid to be measured and measures a physical quantity of the particles, and can be used as, for example, a particle size distribution measuring device. The particle measuring device of the present embodiment can be used in a dynamic environment such as a factory or a plant, and can be used in a static environment such as a laboratory. The particle measuring device of the present embodiment can measure a particle size while continuously transporting a sample, and can stop the sample and measure the particle size.

First Embodiment

FIG. 1 is a schematic configuration diagram of a particle measuring device according to the present embodiment. A particle measuring device 1 includes, for example, a light source 11, a measuring unit 12, a cleaning liquid storage container 13, a light-shielding plate 14, a microscope 15, an image capturing unit 16, an image processing unit 17, a control unit 18, and valves 19 and 20.

The light source 11 irradiates a sample provided on the measuring unit 12 with parallel light A. For example, an LED or a laser can be used as a light emitting element used for the light source 11. When the laser is used, a speckle may be generated due to optical interference caused by a group of particles contained in the sample. Therefore, when the laser is used, coherence can be reduced by installing, for example, a diffuser or a speckle reducer.

Here, an optical axis of the parallel light A is shifted by an angle θth illustrated in the drawing with respect to an optical axis B of the microscope 15. The parallel light A is set such that a distribution width of parallelism with respect to the optical axis of the parallel light A is sufficiently smaller than the angle θth.

A beam size and a shape of the parallel light A are designed such that a component that travels straight without being scattered by the particles contained in the sample flowing inside the measuring unit 12 is not incident on the image capturing unit 16, and only an image of the light scattered by the particles is captured by the microscope 15, and such that an entire field of view of the microscope 15 in a fluid flowing inside the measuring unit 12 can be irradiated.

Here, the light source 11 and the microscope 15 are arranged so as to substantially face each other to sandwich the measuring unit 12. "Substantially facing" here means that the parallel light A of the light source 11 and the optical axis B of the microscope 15 do not coincide with each other, that is, the parallel light A of the light source 11 and the optical axis B of the microscope 15 are not parallel but intersect. More specifically, the matter that the light source 11 and the microscope 15 are arranged so as to substantially face each other to sandwich the measuring unit 12 means that the light source 11 and the microscope 15 are arranged to face each other such that the parallel light A of the light source 11 and the optical axis B of the microscope 15 intersect at a predetermined angle θth of less than 90°.

An incident unit of the microscope 15 can be provided with the light-shielding plate 14 that prevents unnecessary light (here, light directly incident from the light source 11) from entering the microscope 15.

The image processing unit 17 calculates a particle size based on a scattered light intensity. The image processing unit 17 implements a function by reading a computer program 171 stored in a memory (not illustrated) into a microprocessor (not illustrated) and executing the computer program. Based on a scattered light image acquired from the image capturing unit 16 of the microscope 15, the image processing unit 17 calculates a size of particles contained in the scattered light image. The calculation result of the image processing unit 17 is sent to the control unit 18. The image processing unit 17 can also output a signal for monitoring a measurement state to an external display (not illustrated) or the like.

The control unit 18 controls an operation of the particle measuring device 1. The control unit 18 controls, for example, lighting of the light source 11 and adjusts the measuring unit 12. The control unit 18 can also issue an alarm signal or send information such as a particle size or a particle size distribution state to another system (not illustrated) based on a measurement result of the image processing unit 17.

The control unit 18 can be configured as a computer including, for example, a microprocessor, a memory, and an interface circuit. In this case, the computer implements a function as the control unit 18 by reading and executing a predetermined computer program stored in the memory by the microprocessor.

Instead of the above example implemented by the computer and the computer program, the image processing unit 17 or the control unit 18 may be implemented mainly by a hardware circuit. In this case, hardware that can change a connection configuration or the like of a circuit element according to data for controlling the circuit configuration can also be used.

When the image processing unit 17 or the control unit 18 is implemented by the computer and the computer program, a part or all of the computer program, or a part or all of the used data can be stored in a recording medium MM or transferred using a communication network CN.

The light-shielding plate 14 is disposed between the sample and the microscope 15. In the scattered light generated by the particles in the measuring unit, the light-shielding plate 14 causes only the scattered light within a predetermined angle range (the scattered light having the predetermined angle θth or less) to enter the microscope 15.

The measuring unit 12 is connected to a pipe 2 such that the sample flowing through the pipe 2 also flows inside the measuring unit 12.

FIG. 2 is a cross-sectional view of a configuration of the measuring unit in the present embodiment. In FIG. 2, the measuring unit 12 holds a sample inside the measuring unit and irradiates the held sample with the parallel light A. The measuring unit 12 includes a sample container 121 having openings at both ends, an irradiation window driving unit 122 provided on a wall surface of the sample container 121, an irradiation window 123 attached to one end of the irradiation window driving unit 122, an observation window 124 disposed on the wall surface of the sample container 121 so as to face the irradiation window 123, a set of connection ports 125 provided on the openings, nozzles 126 and 128 in which discharge ports are disposed inside the sample container 121, tubes 127 and 129 connected to the nozzles 126 and 128, and valves 130 and 131 connected to the tubes 127 and 129. The tubes 127 and 129 are connected to the cleaning liquid storage container 13, and a cleaning liquid provided in the cleaning liquid storage container 13 is discharged into the sample container 121 by a pump 21.

The sample container 121 is sealed such that outside air does not enter from the outside, and by closing the valves 19 and 20, functions as a sample holding region in which the sample or the cleaning liquid inside the sample container 121 can be held.

The measuring unit 12 may be connected to a production line (not illustrated) via the pipe 2 and directly inject the sample extracted from the production line into the sample container 121 in the measuring unit 12, or may be provided at a remote location without being connected to the production line, and inject the sample extracted from the production line into the sample container 121.

Unlike the sample, the cleaning liquid uses a liquid that does not damage a window, such as water or a liquid that removes a solid component from the sample. A liquid having a cleaning effect such as water to which a dispersant, a surfactant, or the like is added may be used. As a result, a wettability of the window is improved, and adhesion of the sample and air bubbles to the window can be prevented. Alternatively, a slurry which does not damage the window and, for example, contains low-hardness particles of resin may be used. The particles strongly attached to the window can be removed by colliding the low-hardness particles.

The observation window 124 is a window for observing the sample in the sample container 121 by the microscope 15. The observation window 124 is transparent to at least a wavelength of the parallel light A. An optical system is set such that a focus of the microscope 15 is located near a surface of the observation window 124 on a sample side.

The irradiation window 123 is a window for irradiating the sample container 121 with the parallel light A. The irradiation window 123 is provided on the sample container 121 so as to face the observation window 124. The irradiation window 123 is transparent to at least the wavelength of the parallel light A.

The irradiation window driving unit 122 controls a position of the irradiation window 123. The irradiation window 123 can be moved closer to the observation window 124 or away from the observation window 124 by the irradiation window driving unit 122, and a distance between the irradiation window 123 and the observation window 124 can be adjusted. The irradiation window driving unit 122 may operate according to a control signal from the control unit 18, or may be manually operated by a user.

A position of the irradiation window driving unit 122 illustrated in FIG. 2 indicates a position at the time of cleaning, and in this case, the discharge ports of the nozzles 126 and 128 are directed toward the irradiation window 123 and the observation window 124, respectively, and are disposed such that the cleaning liquid can be discharged.

Between the irradiation window driving unit 122 and the sample container 121, a sealing mechanism is provided to prevent the outside air from entering into the sample container 121 and enable the irradiation window driving unit 122 to move. The sealing mechanism includes an O-ring, a diaphragm, and the like.

The discharge ports of the nozzles 126 and 128 are disposed on upstream sides of the observation window 124 and the irradiation window 123, respectively, in a direction in which the sample flows. As a result, the cleaning liquid discharged from the nozzles 126 and 128 is discharged from the sample container 121 together with the sample.

When an image of the sample in the sample container 121 is captured by the microscope 15, the sample is diluted and dispersed as necessary such that the particles do not overlap with each other.

The parallel light A enters through the irradiation window 123 and is emitted to the sample. In the parallel light A, the component that travels straight without being scattered by the particles in the sample passes through the observation window 124 and escapes to the outside of the measuring unit 12. The microscope 15 captures an image of a component of the parallel light A scattered by the particles in the sample in the direction of the optical axis B of the microscope through the observation window 124.

Here, the observation window 124 is desired to be set to a sufficient size such that all the components traveling straight of the parallel light A can be transmitted. When a part of the components traveling straight of the parallel light A hit the sample container 121, the components traveling straight are reflected and scattered inside the sample container 121, and a part of the components traveling straight penetrate into the microscope 15 to deteriorate an S/N ratio in capturing.

The present embodiment describes an example in which the component traveling straight of the parallel light A is transmitted through the observation window 124 and escapes to the outside of the measuring unit 12. Alternatively, an inner wall of the sample container 121 may be coated with a light absorber, or a light absorbing member may be installed inside the sample container 121. As a result, diffused reflection or the like of light in the sample container 121 can be prevented.

As described above, the irradiation window driving unit 122 moves the irradiation window 123 in the direction of the optical axis B of the microscope 15.

FIG. 3 is a cross-sectional view of a configuration of the measuring unit 12 in the present embodiment at the time of measuring the particles. When the particles are measured, as illustrated in FIG. 3, the irradiation window 123 is brought closer to the observation window 124 than when cleaning, the distance between the irradiation window and the observation window is narrowed to reduce a thickness of the sample in the direction of the optical axis B, and a region (volume) of the sample irradiated with the parallel light A is minimized. As a result, the overlap of the particles can be prevented when the image of the sample is captured by the microscope 15, and an influence of the scattered light caused by the particles outside the focus position of the microscope 15, or the like can be prevented. By making the irradiation window 123 and the observation window 124 as close as possible, movement of the particles is prevented, and thus, blurring during capturing an image can be prevented.

After capturing the image by the microscope 15 is completed, the irradiation window 123 is moved away from the observation window 124 by the irradiation window driving unit 122. After separating the irradiation window 123 from the observation window 124, the sample in the sample container 121 can be replaced.

The microscope 15 is focused on an objective side of the sample, and the optical system is designed such that an image of the scattered light from each particle can be captured by the image capturing unit 16 of the microscope 15. In the microscope 15 of the present embodiment, a focal length and a lens diameter are set in order to prevent the component traveling straight of the parallel light A from being incident on the image capturing unit 16.

FIG. 4 illustrates diagrams illustrating scattered light images according to the present embodiment. FIG. 4 illustrates examples of images obtained by capturing images of alumina particles, wherein (a) in FIG. 4 is a diagram illustrating a scattered light image, and (b) in FIG. 4 is a diagram schematically illustrating a scattered light image. The schematic diagram of (b) in FIG. 4 is for illustrating the scattered light image and does not directly correspond to the image of (a) in FIG. 4.

Each point in FIG. 4 illustrates the scattered light from each particle. In the present embodiment, in order to capture an image of a component of the scattered light which is almost parallel to the optical axis B (a component whose angle from the optical axis B is less than or equal to the predetermined angle $\theta$th), the microscope 15 is set such that a focal length with respect to the lens diameter is as long as possible.

The image processing unit 17 recognizes each particle from the image captured by the image capturing unit 16, acquires a scattered light intensity of each particle, and calculates a particle size based on the scattered light intensity.

The image processing unit 17 acquires a value of a pixel having a highest luminance value in a pixel group corresponding to each particle as the scattered light intensity of the particle. Alternatively, the image processing unit 17 can use a peak intensity of the obtained curve as the scattered light intensity by performing fitting with a Gaussian distribution or the like.

Further, the image processing unit 17 prepares in advance a correspondence between a scattered light intensity and a particle size of a sample material as a relational expression or a database, and calculates the particle size by using the relational expression or the database.

When the scattered light intensity is out of a luminance range of the captured image, an output of the light source 11 may be adjusted, an exposure time of the image capturing unit 16 may be adjusted, or a gain of the image capturing unit 16 may be adjusted. Accordingly, the scattered light intensity is kept within a range of the luminance range.

When the scattered light intensities differ greatly depending on particles and the scattered light intensities of all the particles do not fall within the luminance range of the captured image, for example, the output of the light source 11, the exposure time of the image capturing unit 16, or the gain is changed and imaging is performed a plurality of times.

A reason why the particle size can be calculated by recognizing small particles of 1 μm or less in the present embodiment will be described. The scattered light intensity of light due to the particles can be calculated by a Mie scattering theory. FIG. 5 illustrates results of calculating the scattered light intensities for the alumina particles.

In a property diagram of FIG. 5, a horizontal axis exhibits a scattering angle. A vertical axis of FIG. 5 exhibits the calculated values of the scattered light intensities at several particle sizes (for example, 1.0 μm, 0.8 μm, 0.6 μm, 0.4 μm, 0.3 μm, 0.2 μm, and 0.1 μm).

The scattered light intensity exhibits a complicated behavior with respect to the scattering angle due to the optical interference or the like in the particles. However, focusing on the range where the scattering angle is less than or equal to the predetermined angle θth, it was found that the scattered light intensity monotonously increases with the increase in the particle size. Therefore, in the present embodiment, by using a relation illustrated in FIG. 5, the particle size is uniquely calculated from the scattered light intensity in a small-angle scattering range (the range of the predetermined angle θth or less) that changes monotonically with respect to the particle size.

According to the present embodiment configured as described above, the size and position of the particles can be measured based on an intensity of the scattered light scattered from the optical axis of the parallel light A at the predetermined angle θth or less.

FIG. 6 is a flowchart of a particle size distribution measurement process according to the present embodiment. In FIG. 6, the particle measuring device first opens the valves 19 and 20 to introduce the sample into the sample container 121 (S1). After waiting for a predetermined time (S2), and the inside of the sample container 121 is replaced with the sample, the valves 19 and 20 are closed to stop introducing the sample (S3). Then, the irradiation window driving unit 122 is driven to move the irradiation window 123 to a measurement position illustrated in FIG. 3 (S4). Light is emitted from the light source 11, an image of the light scattered by the particles is captured by the microscope 15, and the particle size is measured (S5). Next, the valve 20 is opened (S6), the pump 21 is turned on, the valves 130 and 131 are opened, and the cleaning liquid discharge is started (S7). Then, the irradiation window driving unit 122 is driven to move the irradiation window 123 to a cleaning position illustrated in FIG. 2 (S8). After moving the irradiation window 123, the valve 131 is closed and the cleaning liquid is discharged to the irradiation window 123 for a predetermined time to remove the adhering particles (S9). Next, the valve 131 is opened, the valve 130 is closed, and the cleaning liquid is discharged to the observation window 124 for a predetermined time to remove the adhering particles (S10). Then, the pump 21 is turned off, the valve 131 is closed to stop discharging the cleaning liquid (S11), and the valve 20 is closed to fill the sample container 121 with the cleaning liquid (S12). Then, depending on whether a continuous measurement is continued (S13), if the continuous measurement is to be continued, the process returns to step S1 after waiting until a next measurement timing (S14).

As described above, according to the present embodiment, the particles adhering to the observation window and the irradiation window can be removed by the cleaning nozzle. The inside of the sample container 121 is always filled with the sample or the cleaning liquid, and thus measurement noise due to generation of drying marks on surfaces of the observation window and the irradiation window can be prevented. Accordingly, the particle measuring device 1 can perform an accurate continuous measurement while always keeping the observation window and the irradiation window clean.

In the present embodiment, the example of the optical system in which the component traveling straight of the parallel light A is not incident on the image capturing unit 16 is described, and instead of this example, a polarizing filter may be provided between the sample and the image capturing unit 16 and a polarizing light source may be used as the light source 11. Examples of the polarized light source include a laser light source having polarized light, a combination of the polarizing filter and the light source 11, and the like. By combining the polarizing light source with the polarizing filter, the component traveling straight of the parallel light A can be prevented from being incident on the image capturing unit 16.

In the present embodiment, as a measurement method, although the example of capturing the image of the scattered light of the particles by the microscope is described, a method may also be used in which the irradiation angle θth of the parallel light A is set to 0°, a shadow of the particles is acquired as an image, and the particle size and the shape distribution are measured from a shape of the shadow.

In the present embodiment, the example in which the nozzles 126 and 128 are arranged on the same cross section illustrated in FIG. 2 and the cleaning liquid is alternately discharged during cleaning is described, but the nozzles 126 and 128 may be arranged such that discharge flows do not collide with each other, and the cleaning liquid may be discharged at the same time during cleaning.

Further, in the present embodiment, although the example in which a diluent is stored and supplied in a tank inside the measuring device is described, a supply utility outside the measuring device may be connected.

Second Embodiment

In the present embodiment, an example in which a cleaning operation is performed only when adhering particles are detected will be described. In the present embodiment, the configuration of the particle measuring device 1 is the same as that according to the first embodiment, but an operation of the particle measuring device is different.

FIG. 7 is a flowchart of a particle size distribution measurement process according to the present embodiment. In FIG. 7, the same processes as in FIG. 6 are denoted by the same reference numerals, and the descriptions are omitted. In FIG. 7, a difference from FIG. 6 is that steps S21, S22, and S23 are performed between steps S5 and S6.

In FIG. 7, the particle measuring device measures the particle size in steps S1 to S5 illustrated in FIG. 6, and then determines whether to end the continuous measurement in step S21, and if the continuous measurement is ended, a process of step S612 which is the cleaning operation of steps S6 to S12 illustrated with reference to FIG. 6 is performed, and the measurement is ended.

If the continuous measurement is to be continued in step S21, an adhering particle determination is performed (S22), the number of adhering particles is determined for the adhering particles (S23), and if the number of the adhering particles is less than a threshold, it is determined that cleaning is unnecessary since no substantial adhering particles that affect the measurement exist, and after waiting until the next measurement timing (S14), the process returns to step S1. Meanwhile, if the number of the adhering particles is equal to or greater than the threshold, it is determined that the cleaning is necessary since substantial adhering particles exist, and as a cleaning operation for cleaning the substantial adhering particles, the process of step S612, which is the cleaning operation of steps S6 to S12 in FIG. 6, is performed, and after waiting until the next measurement timing (S14), the process returns to step S1.

In the adhering particle determination, the adhering particles are determined by comparing images before and after the sample of the measuring unit is replaced. That is, the adhering particle determination is performed by comparing the position and size of each particle acquired from the image acquired in step S5 with the position and size of each particle acquired from the image acquired in step S5 in the previous measurement loop, and determining these particles as the attaching particles when differences between the particle positions and the particle sizes are within the predetermined threshold range.

As described above, according to the present embodiment, the cleaning liquid can be saved and a cycle during the continuous measurement can be shortened by determining the adhering particles from the acquired images before and after the continuous measurement and performing the cleaning operation only when the adhering particles are detected.

Third Embodiment

The present embodiment describes an example in which the particle adhesion to the observation window and the irradiation window can be further reduced by improving a sample flow velocity in the sample container, and the cleaning liquid can be saved and the cycle during the continuous measurement can be shortened. In the present embodiment, the configuration of the particle measuring device 1 is the same as that in FIG. 1 except for the measuring unit 12, and an internal configuration of the measuring unit 12 is different.

FIG. 8 is an external view of the measuring unit according to the present embodiment. FIG. 9 is a cross-sectional view of FIG. 8, wherein (a) of FIG. 9 is a cross-sectional view taken along a plane in a z direction of a paper surface including a line A-A in FIG. 8, (b) of FIG. 9 is a cross-sectional view taken along a plane in the z direction of the paper surface including a line B-B in FIG. 8, and (c) of FIG. 9 is a cross-sectional view taken along a plane in the z direction of the paper surface including a line C-C in FIG. 8. In FIGS. 8 and 9, the same functional units as those in FIG. 3 are denoted by the same reference numerals, and the descriptions thereof are omitted.

In FIGS. 8 and 9, the measuring unit 12 includes the sample container 121, a sample introducing port 203, a sample discharging port 206, the nozzles 126 and 128, the irradiation window driving unit 122, the irradiation window 123, the observation window 124, the tubes 127 and 129, and the valves 130 and 131.

The nozzles 126 and 128 are formed directly in the sample container 121 by drilling and are connected to the cleaning liquid storage container 13 via the tubes 127 and 129, the valves 130 and 131, and the pump 21, and the cleaning liquid provided in the cleaning liquid storage container 13 is discharged by the pump 21 into the sample container 121.

The internal configuration of the sample container 121 is designed such that the sample introduced from the sample introducing port 203 always passes through a narrow portion 210 which is a region sandwiched between the irradiation window 123 and the observation window 124. The narrow portion 210 is preferably disposed near a center when viewed from the sample introducing port 203. Therefore, the observation window 124 is disposed near a center of a sample flow path in the sample container 121 by a pedestal 209.

A position of the irradiation window driving unit 122 illustrated in FIG. 9 indicates a position at the time of introducing the sample and is set such that the distance between the irradiation window 123 and the observation window 124 is larger than a maximum particle size contained in the sample and a flow velocity at the time of introducing the sample is maximized. By designing a cross-sectional area of the region sandwiched between the irradiation window 123 and the observation window 124 in that case to be narrower than a cross-sectional area of the sample introducing port 203, the flow velocity of the sample becomes faster than that on an upstream side, and the flow velocity of the sample can be increased.

When cleaning the windows with the nozzles 126 and 128, the irradiation window 123 drives the irradiation window driving unit 122 in the direction away from the observation window 124 from the position illustrated in FIG. 9, and the cleaning liquid discharged from the respective nozzles is discharged to the irradiation window 123 and the observation window 124, respectively. In the present embodiment, the nozzles 126 and 128 are disposed such that the discharge flows do not collide with each other, and the irradiation window 123 and the observation window 124 can be cleaned at the same time. Accordingly, a cleaning time can be shortened and the cycle during the continuous measurement can be shortened.

The nozzles 126 and 128 are arranged on the upstream side of the irradiation window 123 and the observation window 124, respectively, in the direction in which the sample flows. As a result, the cleaning liquid discharged from the nozzles 126 and 128 is discharged from the sample discharging port 206 together with the sample.

FIG. 10 is a flowchart of a particle size distribution measurement process according to the present embodiment. In FIG. 10, the same processes as in FIG. 7 are denoted by the same reference numerals, and the descriptions are omitted. In FIG. 10, a difference from FIG. 7 is that step S1 of introducing the sample is changed to step S31 to S36.

In FIG. 10, the particle measuring device first moves an irradiation window 207 to a sample introducing position 1 in which the distance between the irradiation window 123 and the observation window 124 illustrated in FIG. 9 is narrowed (S31), turns on a sample introducing pump (not illustrated) (S32), waits for a predetermined time (S33), and then opens the valves 19 and 20 to start introducing the sample into the sample container 121 (S34). By setting a delay from turning on sample introducing pump to opening the valves, a pressure on an upstream side of the valve 19 is temporarily increased, the flow velocity of the sample immediately after the valve is opened is increased, and the particles adhering to the windows due to the flow of the sample can be removed. Therefore, after waiting for a predetermined time (S35) to remove the particles adhering to the windows, the irradiation window 123 is kept away from the observation window 124 (a sample introducing position 2, S36), and the sample in the sample container 121 is replaced while waiting for a predetermined time (S2). After that, the processes are the same as those in FIG. 7.

As described above, according to the present embodiment, by increasing the sample flow velocity in the irradiation window and the observation window, the adhering particles can be removed by the flow of the sample, a number of times for performing the cleaning operation can be reduced, the cleaning liquid can be saved, and the cycle during the continuous measurement can be shortened.

Fourth Embodiment

The present embodiment describes an example in which not only the adhering particles are removed by using the cleaning nozzle, but also the sample to be measured is diluted, so that an amount of the used diluent can be reduced by reducing a capacity of a primary dilution tank and the system can be miniaturized.

FIG. 11 is a schematic configuration diagram of the particle measuring device 1 according to the present embodiment. In FIG. 11, the same configurations as in FIG. 1 are denoted by the same reference numerals, and the descriptions are omitted. In FIG. 11, a difference from FIG. 1 is that a diluent tank 301, a primary dilution tank 302, pumps 303 and 304, a pipe 305, and valves 306, 307, and 308 are provided.

In FIG. 11, the sample introduced into the particle measuring device 1 is mixed with a diluent supplied from the diluent tank 301 by the pump 304 in the primary dilution tank 302 and diluted to a concentration suitable for measurement. The diluted sample is introduced into the measuring unit 12 by the pump 303 via the pipe 2 and the valve 19. The diluent is supplied to the cleaning nozzle provided in the measuring unit 12 via the pipe 305 and used as the cleaning liquid. That is, the sample is secondarily diluted in the measuring unit by using the cleaning liquid discharged from the cleaning nozzle.

In the primary dilution tank 302, the sample and the diluent are mixed by a stirrer to prepare a diluted sample to be used for the measurement. The stirrer may be, for example, a device that performs stirring with a stirring blade or a device that performs stirring with ultrasonic waves, as long as mixing can be appropriately performed.

FIG. 12 is a flowchart of a particle size distribution measurement process according to the present embodiment. In FIG. 12, the same processes as in FIG. 6 are denoted by the same reference numerals, and the descriptions are omitted. In FIG. 12, a difference from FIG. 6 is that steps S41 to S43 are performed instead of step S1, and steps S44 to S48 are performed between steps S3 and S4.

In FIG. 12, the particle measuring device first introduces the sample into the primary dilution tank (S41) and mixes the sample with the diluent in the primary dilution tank (S42). Next, the pump 303 is turned on, the valves 19 and 20 are opened, and the primarily diluted sample is introduced into the measuring unit 12. At the same time, the pump 304 is turned on, the valves 306, 130, and 131 are opened, the diluent is supplied from the nozzles 126 and 128, and a secondary dilution is performed in the sample container 121 (S43). The sample in the sample container 121 is replaced while waiting for a predetermined time (S2). The inside of the sample container 121 is replaced with the sample, and the valves 19 and 20 are closed to stop introducing the sample (S3).

In the present embodiment, an integrated measurement is performed, in which the same primarily diluted sample is measured a plurality of times, and the number of the particles to be measured is increased, so that a measurement accuracy of the particle size distribution is improved. Therefore, next, whether to perform the integrated measurement is determined (S44). If the integrated measurement is performed, the measurement and the cleaning operation of steps S4 to S12 in FIG. 6 are performed while holding the sample in the primary dilution tank (S612 is a cleaning operation process of steps S6 to S12 in FIG. 6), and if the continuous measurement is performed continuously (S13), after waiting until a next measurement timing (S14), the process returns to step S43, and the sample in the primary dilution is measured.

If the integrated measurement is ended, the valve 308 is opened and the sample in the primary dilution tank 302 is discharged (S45). Then, the valve 308 is closed, the pump 304 is turned on, the valve 307 is opened, and the diluent is charged into the primary dilution tank 302 (S46). If the continuous measurement is performed continuously (S47), the process returns to step S41 after waiting until the next measurement timing (S48). In order to minimize the residual sample in the primary dilution tank 302, steps S45 and S46 may be repeated a plurality of times to perform replacement cleaning.

In the present embodiment, although the example in which the diluent is stored and supplied in the tank inside the measuring device is described, the supply utility outside the measuring device may be connected.

In the present embodiment, although the example in which the supply of the diluent is controlled by using the pump 304 and valves 306 and 307 is described, two pumps corresponding to the primary dilution tank 302 and the measuring unit 12, respectively, may be provided, and the diluent may be supplied at flow rates suitable for the primary dilution tank and the measuring unit.

As described above, according to the present embodiment, by performing the secondary dilution of the sample to be measured by using the nozzles used for window cleaning, the amount of the used diluent can be reduced by reducing the capacity of the primary dilution tank and the system can be miniaturized by downsizing the primary dilution tank.

The embodiments have been described above, but the invention is not limited to the embodiments described above, and includes various modifications. For example, the above embodiments have been described in detail for easy understanding of the invention, and the invention is not necessarily limited to those including all the configurations described above. A part of a configuration of one embodiment can be replaced with a configuration of another embodiment, and the configuration of another embodiment can be added to the configuration of one embodiment. A part of the configuration of each embodiment may be added, deleted, or replaced with another configuration.

REFERENCE SIGN LIST

1 particle measuring device
2 pipe
11 light source
12 measuring unit
13 cleaning liquid storage container
14 light-shielding plate
15 microscope
16 image capturing unit
17 image processing unit 18 control unit
121 sample container
122 irradiation window driving unit
123 irradiation window
124 observation window
125 connection port
126, 128 nozzle
127, 129 tube
130, 131 valve
203 sample introducing port
206 sample discharging port
209 pedestal
210 narrow portion
301 diluent tank
302 primary dilution tank

The invention claimed is:

1. A particle measuring device for recognizing particles contained in a fluid and measuring a physical quantity of the particles, the particle measuring device comprising:
    a sample holding region configured to hold a sample containing the particles;
    an observation window disposed on a wall surface of the sample holding region;
    a light source configured to irradiate the particles with light;
    an irradiation window provided on an other wall surface of the sample holding region to face the observation window and configured to permit the light to pass through to irradiate the particles;
    an irradiation window driver provided on the other wall surface and attached to one side of the irradiation window and configured to adjust a distance between the irradiation window and the observation window;
    an image capturing unit configured to face the light source to capture images of the sample at various times;
    two cleaning nozzles, each having a discharge port, are configured to discharge a cleaning liquid toward the observation window and the irradiation window, respectively, where the cleaning liquid is different from the fluid to be measured;
    an image processing unit configured to image-recognize the particles in the images, and measure, based on image-recognizing the particles in the images, the particles; and
    a control unit communicatively coupled to the light source and the image processing unit, wherein the control unit is configured to:
        obtain, from the image processing unit, a first image of the sample holding area, wherein the first image is acquired prior to replacing the sample,
        obtain, from the image processing unit, a second image of the sample holding area, wherein the second image is acquired after replacing the sample,
        determine whether cleaning is required by comparing the first image and the second image, and
        execute a cleaning routine in response to determining that the cleaning is required;
    wherein the cleaning routine includes:
        controlling the irradiation window driver to increase a distance between the irradiation window and the observation window, and
        controlling the two cleaning nozzles to clean the observation window, and
    wherein the discharge port of the two cleaning nozzles are disposed on upstream sides of the observation window and the irradiation window, respectively, in a direction in which the sample flows.

2. The particle measuring device according to claim 1, wherein
    the sample holding region further includes a seal that prevents outside air from entering the sample holding region at a location on the other wall surface where the irradiation window and the irradiation window driver are located.

3. The particle measuring device according to claim 2, wherein
    the sample holding region further includes a valve disposed either upstream of the observation window and the irradiation window or downstream of the observation window and the irradiation window.

4. The particle measuring device according to claim 1, wherein
    the cleaning liquid is water or a liquid for removing a solid component from the sample.

5. The particle measuring device according to claim 1, wherein
    the cleaning liquid is water to which a dispersant or a surfactant added.

6. The particle measuring device according to claim 1, wherein
    the cleaning liquid is a slurry containing resinous low-hardness particles.

7. The particle measuring device according to claim 1, wherein the comparing of the first image and the second image to determine whether cleaning is required includes:
    determining, based on the first image and the second image, a number of the particles adhering to the observation window or the irradiation window as adhering particles,
    determining, if the number of the adhering particles is greater than a threshold,
    on a condition that the number of the adhering particles is greater than the threshold, determine that the cleaning is required and
    on a condition that the number of the adhering particles is less than the threshold, determine that the cleaning is not required.

8. The particle measuring device according to claim 1, further comprises:
    a sample introducing port of the sample holding region which introduces the sample into the sample holding region, wherein
    the irradiation window driver creates a narrow portion between the irradiation window and the observation window in the sample holding region by moving the irradiation window closer to the observation window, and
    the irradiation window driver moves the irradiation window closer to the observation window such that a cross-sectional area of the narrow portion is smaller than a cross-sectional area of the sample introducing port and that a flow velocity of the sample at the narrow portion is faster than a flow velocity at the sample introducing port.

9. The particle measuring device according to claim 1, wherein
    the sample is diluted in the sample holding region by using the cleaning liquid discharged from the two cleaning nozzles.

10. The particle measuring device according to claim 1, wherein
    the irradiation window driver moves the irradiation window into the sample holding region.

11. The irradiation window driver according to claim 10, wherein the control unit is further configured to
control the irradiation window driver to move the irradiation window closer to the observation window or away from the observation window, such that the distance between the irradiation window and the observation window is changed.

\* \* \* \* \*